Figure 1:
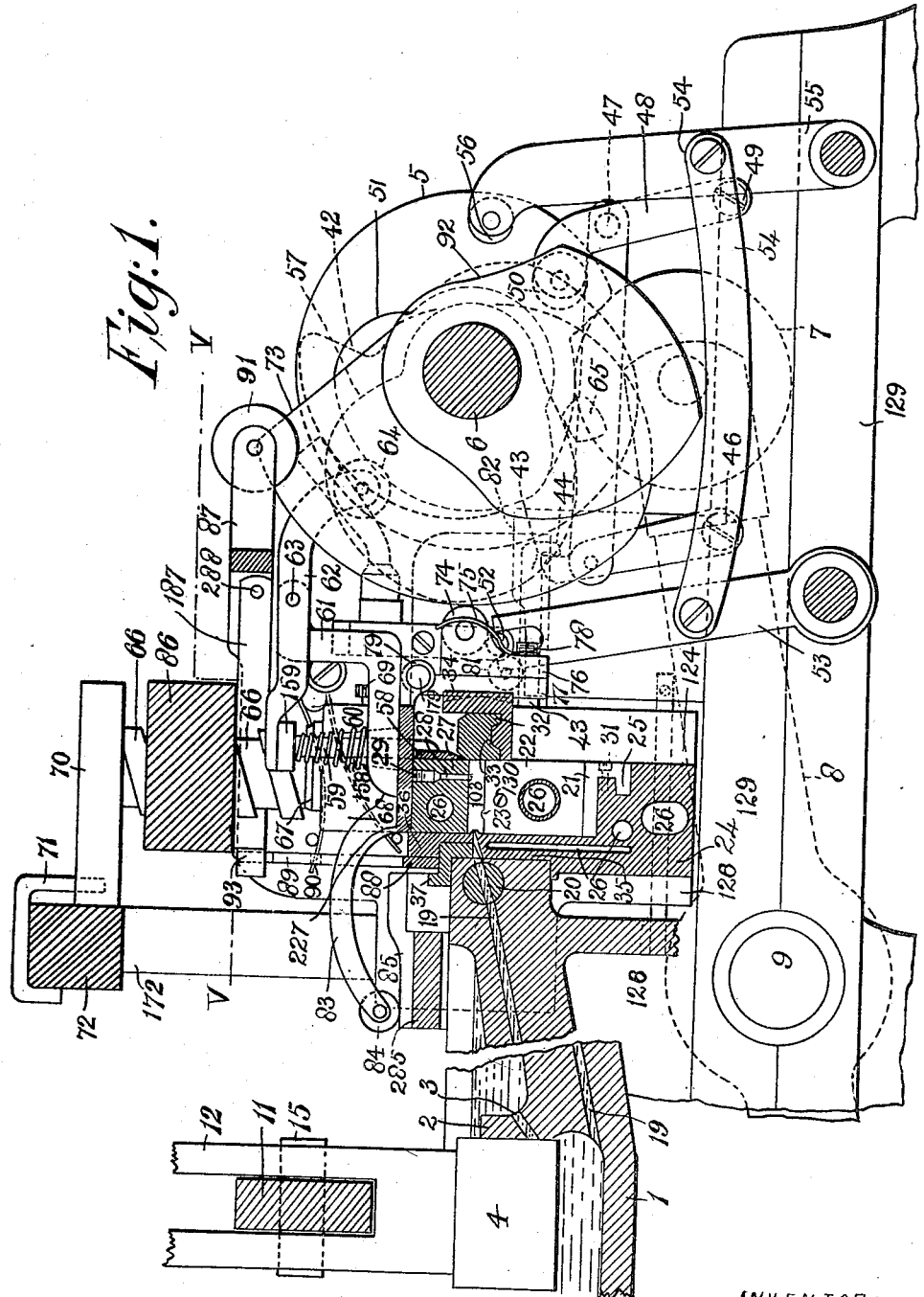

S. A. BHISEY.
TYPE CASTING AND DISTRIBUTING APPARATUS.
APPLICATION FILED MAY 15, 1909.

1,122,676.

Patented Dec. 29, 1914.
11 SHEETS—SHEET 1.

WITNESSES:
John C. Sanders
Leon Spring

INVENTOR:
Shanker Abaji Bhisey
BY Wm. Wallace White
ATT'Y.

S. A. BHISEY.
TYPE CASTING AND DISTRIBUTING APPARATUS.
APPLICATION FILED MAY 15, 1909.
1,122,676.
Patented Dec. 29, 1914.
11 SHEETS—SHEET 2.
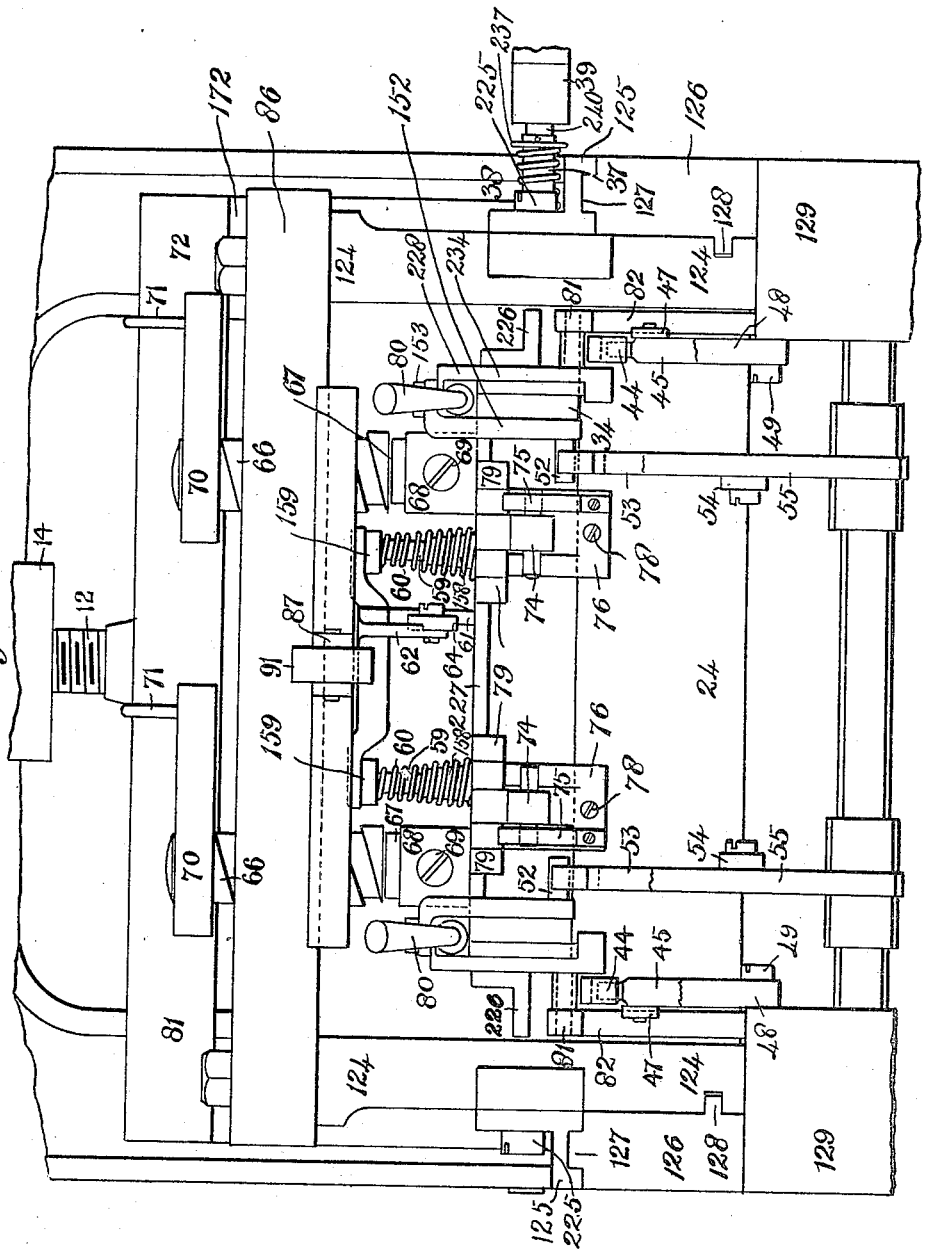
WITNESSES:
John C. Sanders
Leon Spring
INVENTOR:
Shanker Abaji Bhisey
BY Wm Wallace White
ATTY.

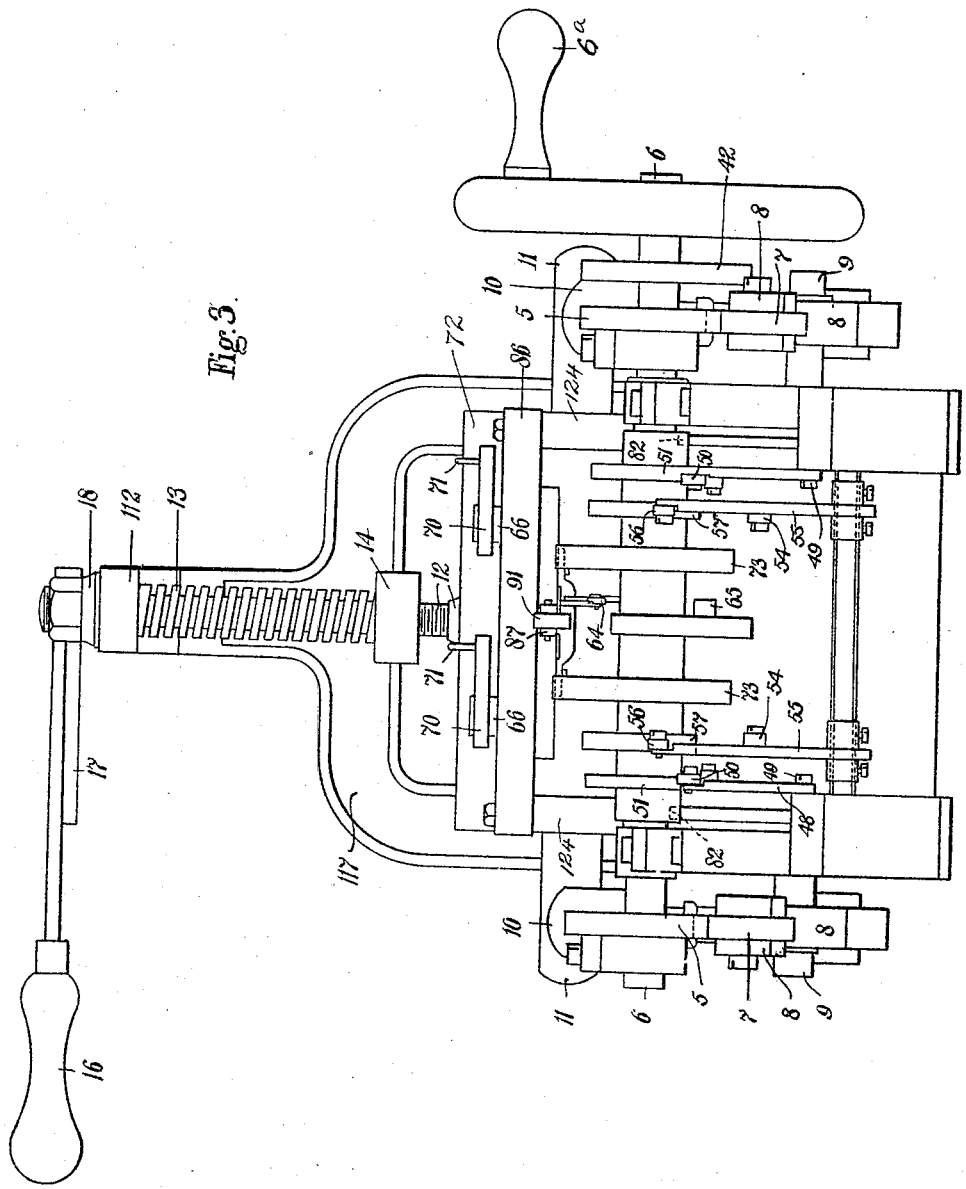

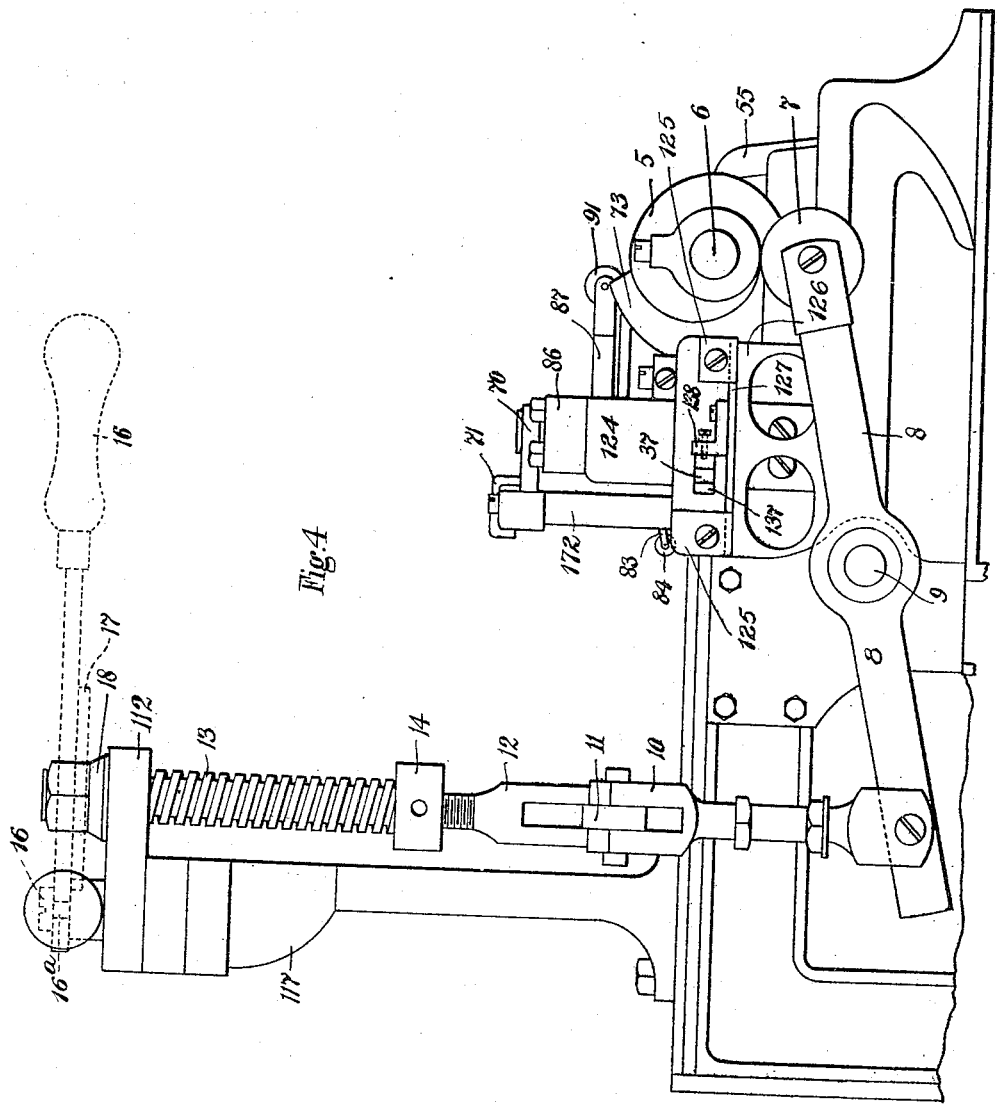

S. A. BHISEY.
TYPE CASTING AND DISTRIBUTING APPARATUS.
APPLICATION FILED MAY 15, 1909.
1,122,676.
Patented Dec. 29, 1914.
11 SHEETS—SHEET 5.
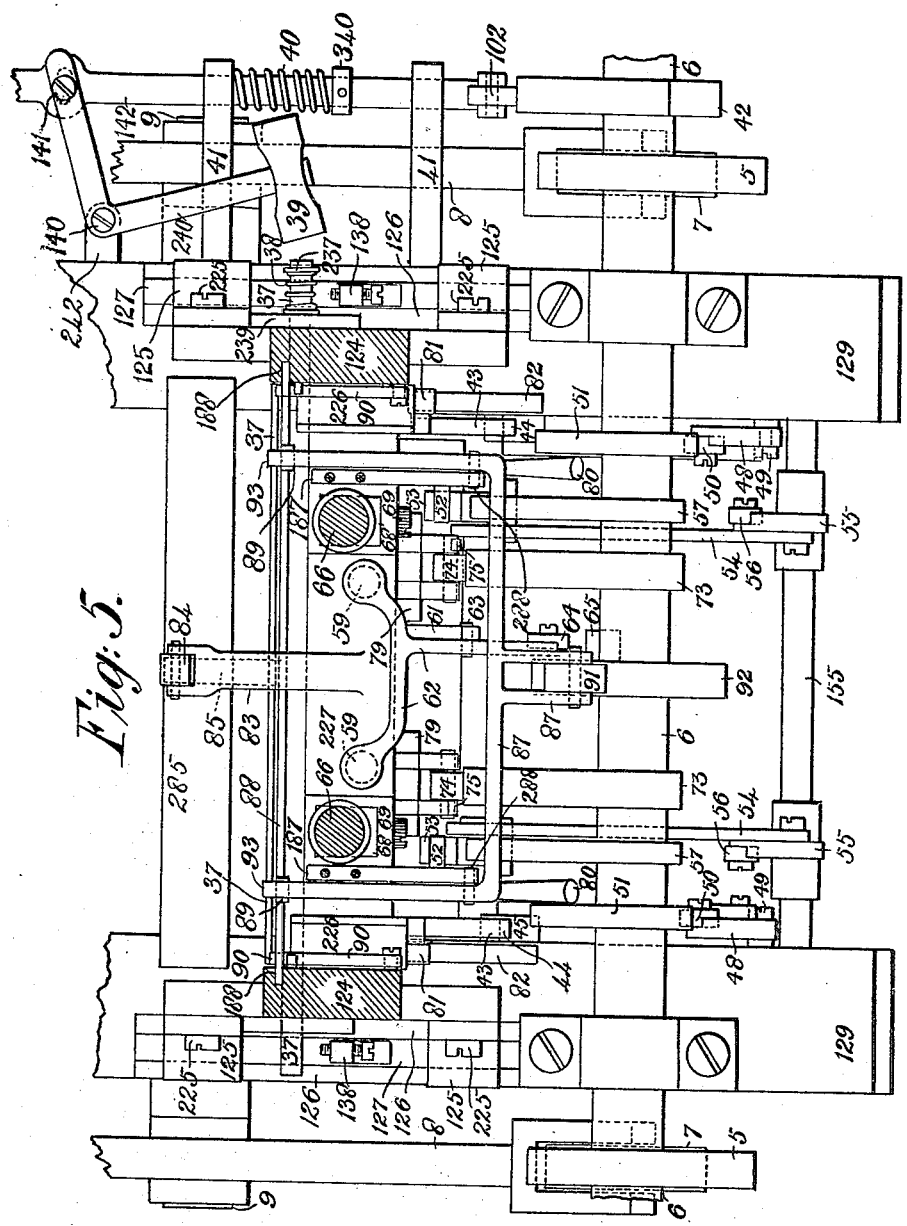

S. A. BHISEY.
TYPE CASTING AND DISTRIBUTING APPARATUS.
APPLICATION FILED MAY 15, 1909.
1,122,676.  Patented Dec. 29, 1914.
11 SHEETS—SHEET 6.
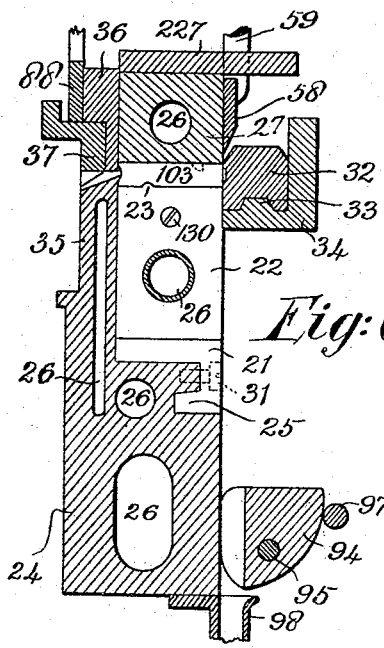
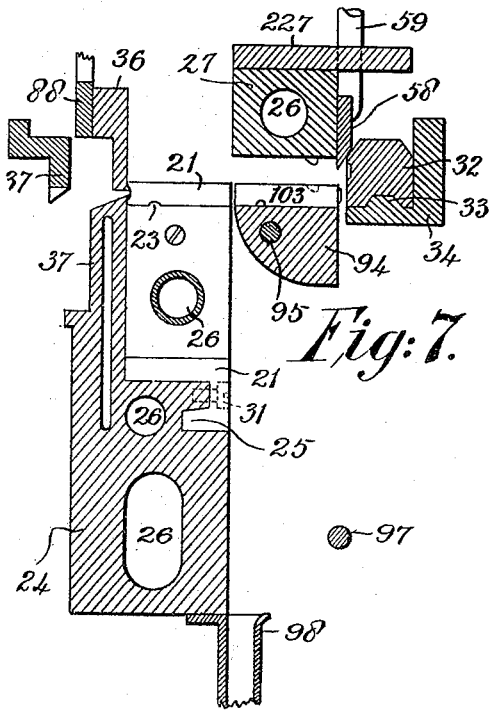
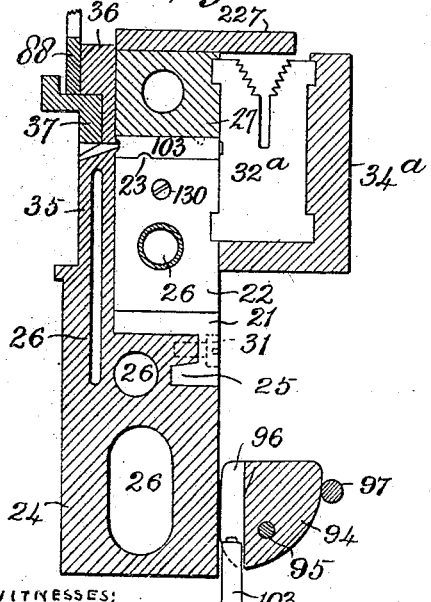
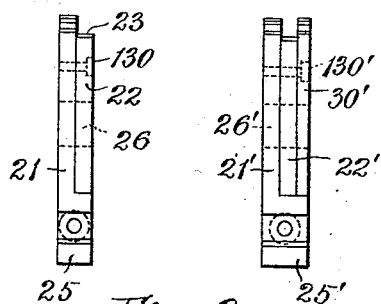
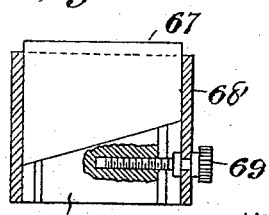

S. A. BHISEY.
TYPE CASTING AND DISTRIBUTING APPARATUS.
APPLICATION FILED MAY 15, 1909.

1,122,676.

Patented Dec. 29, 1914.
11 SHEETS—SHEET 7.

WITNESSES:
John C. Sanders
Leon Spring

INVENTOR:
Shanker Abaji Bhisey,
BY Wm. Wallace White
ATT'Y

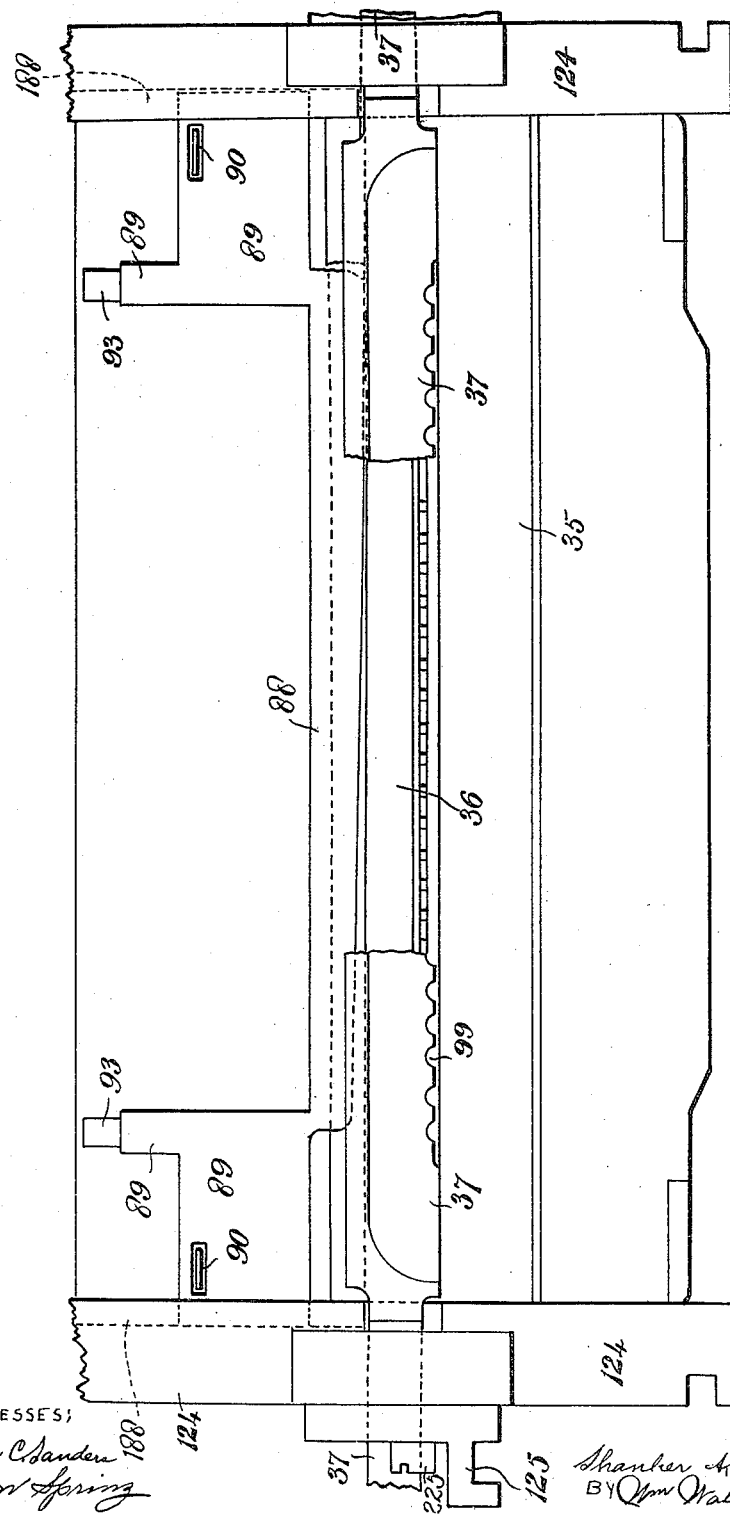

S. A. BHISEY.
TYPE CASTING AND DISTRIBUTING APPARATUS.
APPLICATION FILED MAY 15, 1909.
1,122,676.
Patented Dec. 29, 1914.
11 SHEETS—SHEET 9.
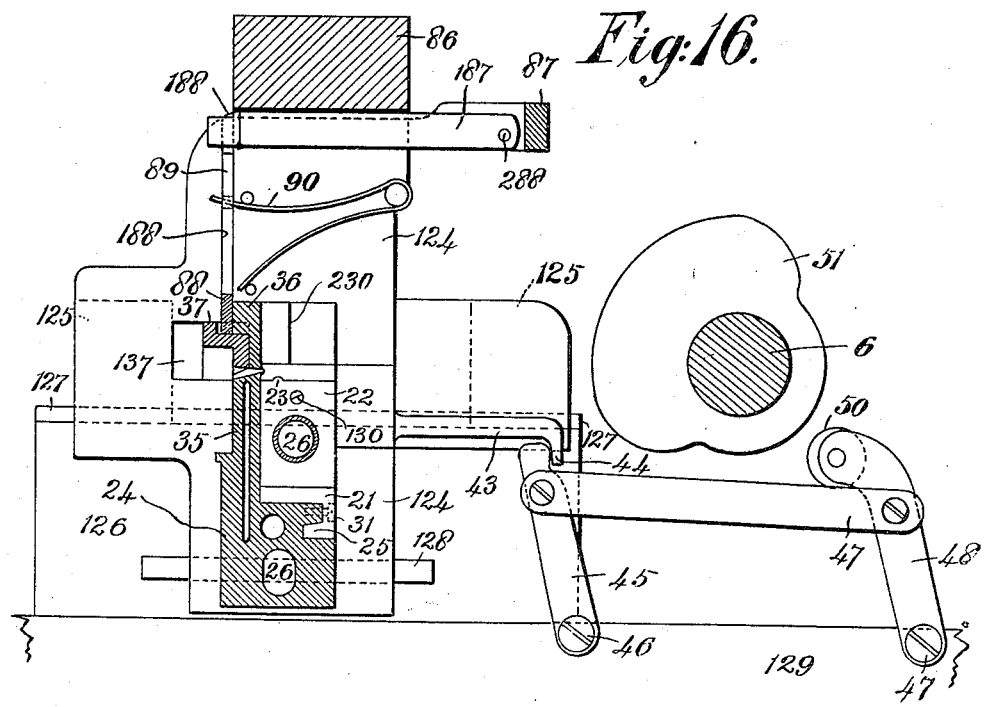
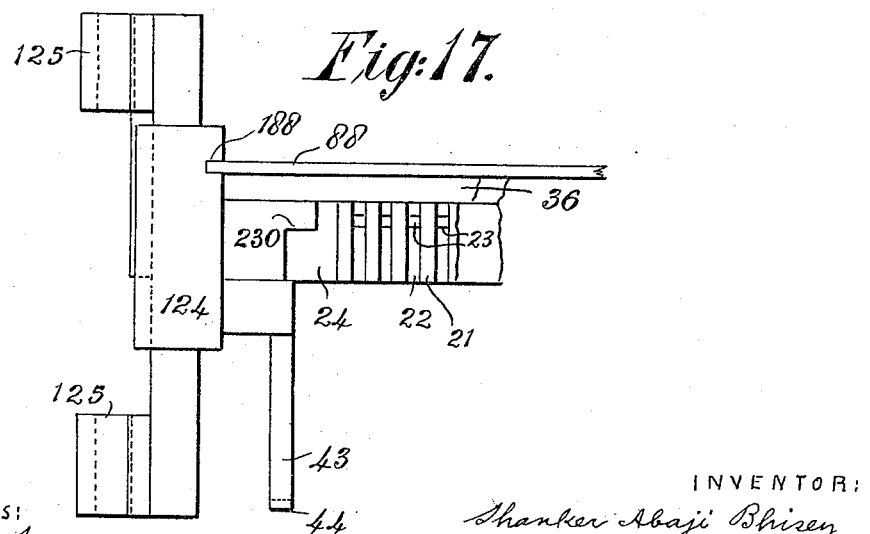

S. A. BHISEY.
TYPE CASTING AND DISTRIBUTING APPARATUS.
APPLICATION FILED MAY 15, 1909.
1,122,676.
Patented Dec. 29, 1914.
11 SHEETS—SHEET 10.
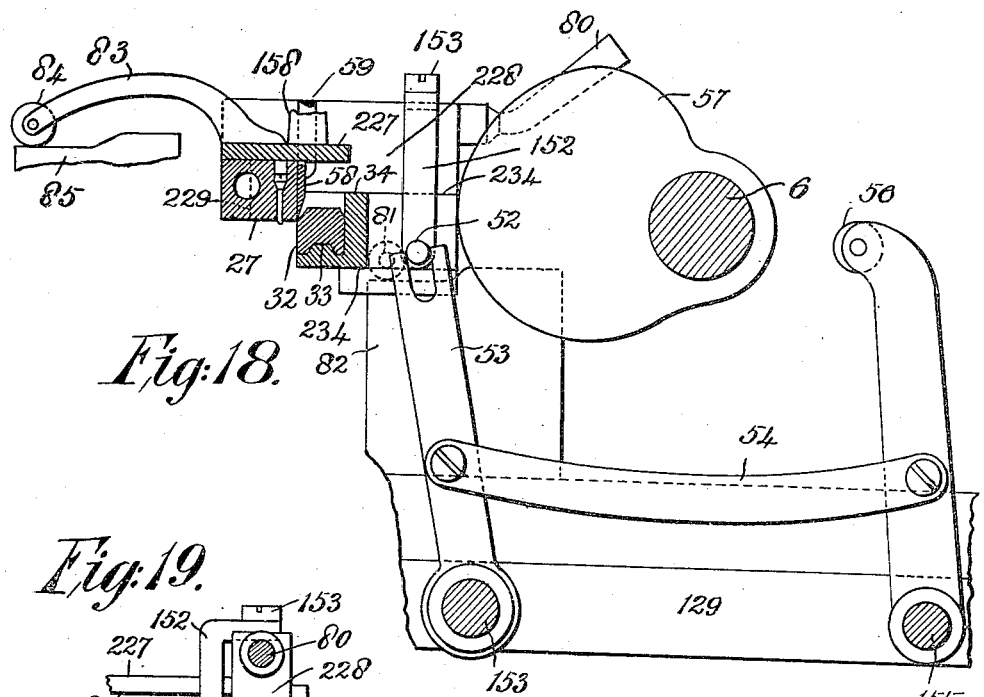
Fig. 18.
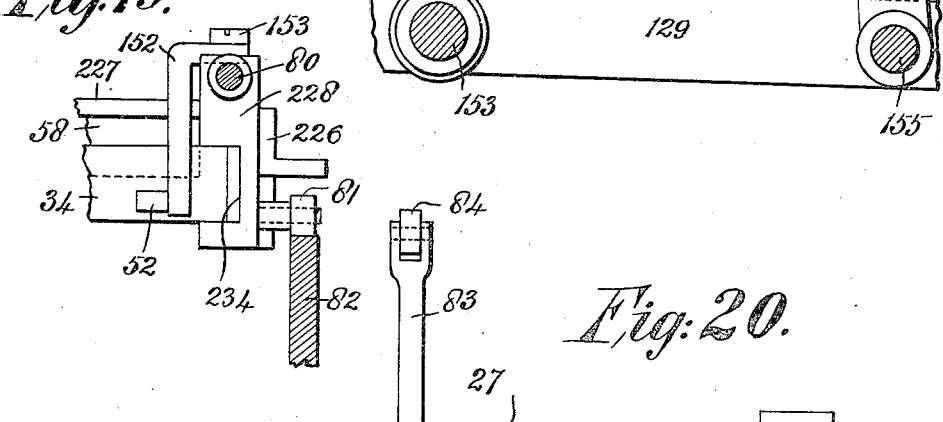
Fig. 19.
Fig. 20.
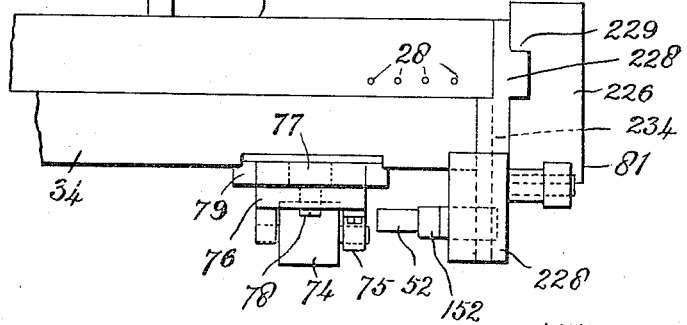
WITNESSES:
John C. Sanders
Leon Spring
INVENTOR:
Shanker Abaji Bhisey,
BY Wm Wallace White
ATT'Y.

S. A. BHISEY.
TYPE CASTING AND DISTRIBUTING APPARATUS.
APPLICATION FILED MAY 15, 1909.
1,122,676.
Patented Dec. 29, 1914.
11 SHEETS—SHEET 11.
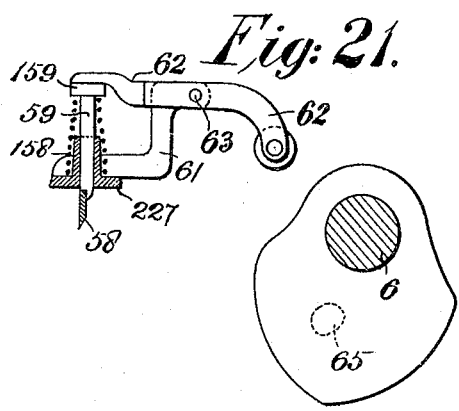
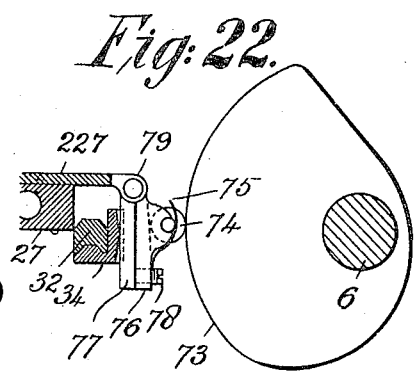
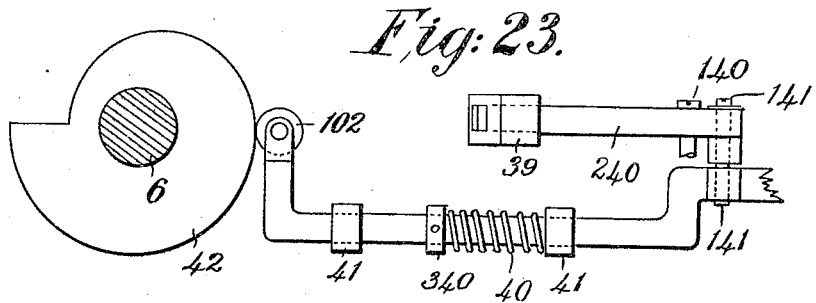
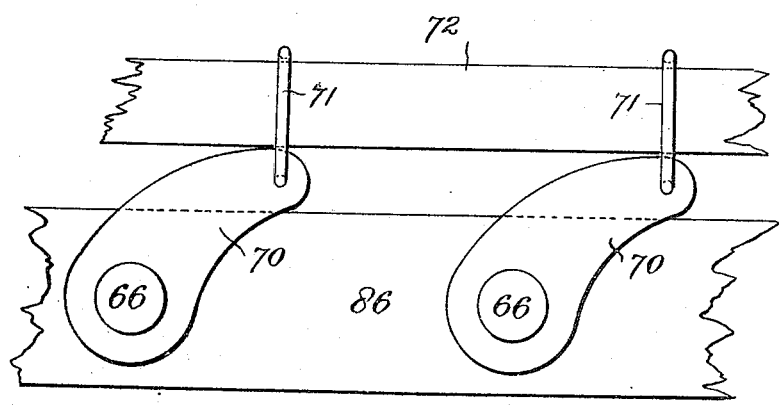
WITNESSES:
John C. Sanders
Leon Spring
INVENTOR:
Shanker Abaji Bhisey
BY Wm Wallace White
ATT'Y.

UNITED STATES PATENT OFFICE.

SHANKER ABAJI BHISEY, OF LONDON, ENGLAND.

TYPE CASTING AND DISTRIBUTING APPARATUS.

1,122,676.

Specification of Letters Patent.

Patented Dec. 29, 1914.

Application filed May 15, 1909. Serial No. 496,160½.

*To all whom it may concern:*

Be it known that I, SHANKER ABAJI BHISEY, engineer, a subject of the King of Great Britain, residing temporarily at Ramwadi, Bombay, India, but whose permanent address is 323 Essex road, in the county of London, England, have invented new and useful Improvements in Type Casting and Distributing Apparatus, of which the following is a specification.

This invention relates to means for casting types and it has for its object an improved device operating to some extent on the lines of the type casting portion of the combined type casting and setting machine described in the specification of my former United States Patent No. 789708.

According to the present invention the purpose of which is to provide for the repeated casting of sets of types from any desired set of molds and matrices modifications are made in the structure, arrangement and method of operation of the parts immediately concerned in the casting operation, and improved devices are provided for the removal of the types as made.

The invention has for its object an improved apparatus the purpose of which is to cast a series of type at one operation, to extract them from the molds and discharge them into a receiver.

More particularly defined the invention comprises a plurality of molds of improved construction with means completing said molds and adapted to be removed to free the type, and means for bringing said molds up to a casting spout and injecting molten metal into them.

It is an especial object of the invention to cast a series of type united by a "brake piece" and to sever said brake piece subsequently from the cast type.

A further object of the invention is to facilitate the removal of the type from the molds by motion of a cover plate forming the top of the molds and of the matrices. And it is also the object of the invention to provide mechanism by which the molds may be securely and easily closed for a fresh operation.

Other features of the invention will be described more particularly in the following statement and pointed out in the appended claims.

The invention is illustrated in the accompanying drawings, in which—

Figure 12:
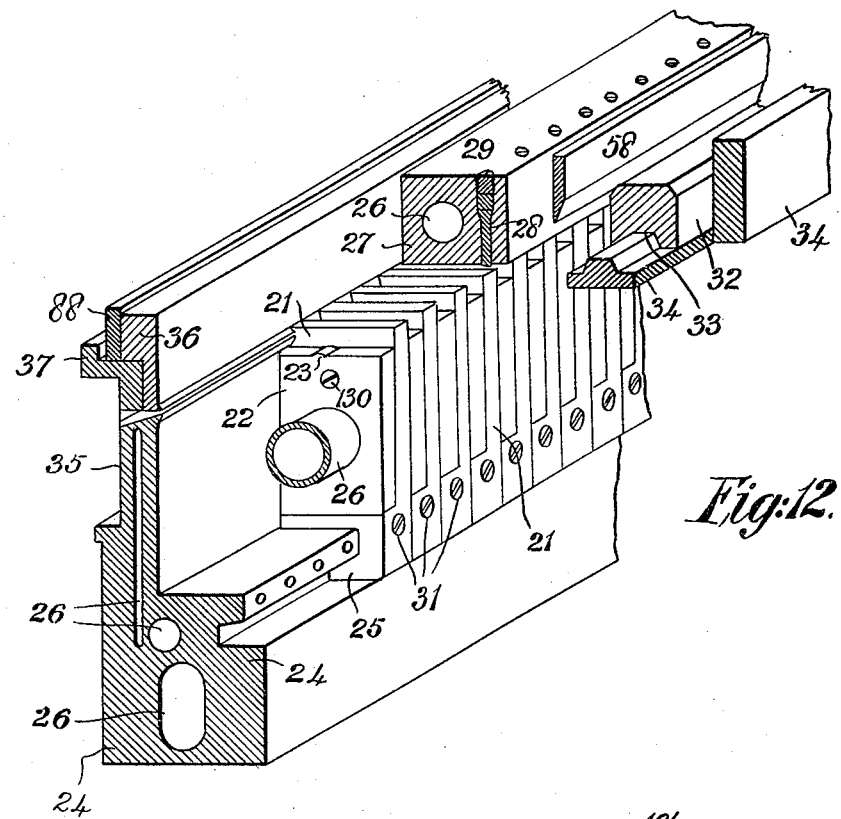
Figure 13:
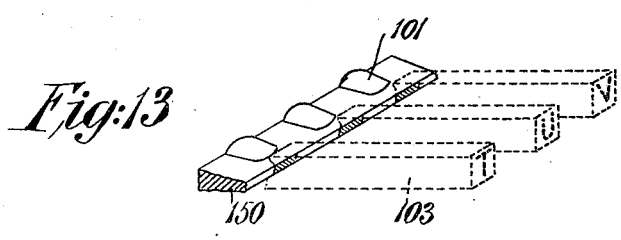
Figure 14:
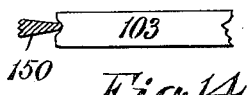

Figure 1 is a section through the major part of the machine, as viewed from the side. Fig. 2 is a front elevation of the same with the cam shaft removed. Fig. 3 is a front elevation drawn to a smaller scale and illustrating chiefly the main driving shaft. Fig. 4 is a corresponding side elevation, illustrating chiefly the method of operation of the pump for the molten metal. Fig. 5 is a sectional plan of the machine on line V—V of Fig. 1. Figs. 6 and 7 are two sectional side elevations showing in two positions, the parts forming the molds and the apparatus for discharging the types after they are cast. Fig. 8 is a view corresponding to Fig. 6 showing a modification. Fig. 9 is a detail view of the wedge block. Figs. 10 and 11 are detail views showing forms of molds in end elevation. Fig. 12 is an isometric view partly in section showing the molds and parts in connection therewith. Fig. 13 is an isometric view partly in section showing a portion of a break-piece with the types (shown dotted) attached thereto. Fig. 14 is an end view of the same. Fig. 15 is a rear elevation of the carriage sustaining the mold parts, as seen from in front of the container for the molten metal. Fig. 16 is a detail view showing in section the carriage carrying the molds with the means for moving the same. Fig. 17 shows a plan view of part of the mold carriage with the cover plate and upper parts removed. Fig. 18 is a detail view showing in section the mold cover and the matrix bar, and means for operating the same. Fig. 19 is a rear elevation of a portion shown in Fig. 18. Fig. 20 is an underneath plan view of part of the cover plate. Fig. 21 is a detail view of the mechanism serving to release the type heads from the matrices. Fig. 22 is a detail view showing the device which presses the mold parts against the casting spout. Fig. 23 is a detail view showing the mechanism for actuating the hammer (shown in plan in Fig. 5). Fig. 24 is a detail view of the device acting to press down the cover plate on the mold bodies.

The machine is actuated by means of a shaft 6, seen in Figs. 1, 3, 4 and 5, driven in any suitable way, as for instance by handle 6ª shown in Fig. 3. The shaft 6 carries cams 5 for actuating the apparatus which supplies the molten metal. Any suitable apparatus may be used for this purpose, as for instance that shown in section in Fig. 1, wherein a container 1 is used and is of course kept heated in any convenient manner. The center part of the container is separated from the rest by a cylindrical partition 2 in which perforations are formed as at 3, in order to allow of the ingress of the molten metal to the central part of the container. Within the central part 2 moves a plunger 4 serving to displace the metal from the container and to force it through the spout 19 into the molds. Levers 8 pivoted on the frame 129 at 9, carry rollers 7 which bear upon the cams 5 on shaft 6, while the other ends of said levers are connected by links 10 to a bar 11 extending across the machine above the plunger 4. The plunger 4 has its stem 12 extended upward and slotted for the bar 11 to pass through it as seen in Fig. 1, where a pin 15 is shown as pivotally connecting bar 11 to stem 12. The stem 12 is extended upwardly and passes through a lug 112 carried by a bracket 117, Fig. 4, forming part of the machine frame. A spring 13 surrounding the upper portion of the stem 12 presses on the one hand against the lug 112, and on the other hand against an adjustable collar 14 fitted on a screwed part of the stem 12. The position of collar 14 on the stem can therefore be adjusted to vary the pressure of the spring 13. The downward movement of the stem 12 is limited by means of a head 18 attached to the top of the stem above the lug 112, and a hand lever 16 pivoted at 16ª on the bracket 117 has a projecting plate 17 upon it which will engage beneath the head 18 if required when the stem 12 is in its raised position, and when the lever 16 is turned into the position shown in dotted lines in Fig. 4; the plate 17 will thus hold up the stem 12 and the pump plunger, preventing it from operating until the stem 12 is again released.

The container 1 for the molten metal ends in a spout 19 which is formed in this construction with a flat face. Within the spout near its end, a transverse cylindrical hole may be bored to receive a rod 20 having a diametral slot or series of passages. This rod forms a cock, by turning which the metal may be shut off from the molds. In use the container 1 is filled by a separate pump with molten metal from a main reservoir, and overflow openings are provided in its walls, which keep the level of the molten metal just slightly below the spout.

The molds comprise three principal parts: the main portions 21, 22 forming the bottoms and sides, a cover plate 27, and the matrix block 32. The main part of the mold is illustrated in detail in Figs. 1, 6, 7, 8, 10, 11 and 12. Each is formed from a block 21 of the desired depth, and of sufficient width to accommodate the largest grade of type to be cast and to still allow space for a dividing wall. Of course the molds can be arranged to cast logotypes if required, i. e. types comprising two or more letters. One face of the block 21 is removed over a large part of the surface, leaving the block L-shaped in section. A plate 22 is then secured to the block 21 by screws 130 or in any other suitable way, this plate being of such depth as to leave the top of the block of L-shaped section so as to form a receptacle for the molten type metal. The object of building up the molds from two pieces in this way is principally to secure the formation of sharp corners to the mold cavity. The filling plate 22 is formed with one or more projections 23 (Figs. 1, 10 and 12) which serve to form the nicks in the type bodies. These projections may be ribs upon the metal itself or may be formed by pins driven across it. The molds are held in their support 24 by catches or tail pieces 25, the upper surfaces of which are preferably made slightly sloping to engage with a correspondingly formed overhanging surface in the support 24, so that when the molds are pressed home they are also brought down to the exact required horizontal plane. The molds are finally held in place by suitable holding screws 31 passing into the mold support 24. The part 21 of one mold block forms the side wall of the next mold as in the construction described in my former patent specification above referred to. Preferably each mold has one or more holes 26 bored in it, and when the molds are assembled upon their support these holes are opposite each other and a tube may be passed through them to form a passage for the circulation of water. Similar holes 26 may be provided in the support 24 and also in the cover plate 27. The connecting pipes are preferably so arranged that the cold water circulates first through the parts where cooling is most required, and then through the less important passages. In the cover plate 27 are arranged pins 28 serving for the extraction of the types 103 and these pins are preferably formed with a flat surface facing the matrix block. There is a pin 28 for each mold cavity, and the pins may be adjusted in position by turning the screw heads 29 which are exposed at the top of the cover plate.

In an alternative form of mold, illustrated in Fig. 11, three separate parts are employed instead of two. The first 21' has the major portion of one face removed as before, but to a depth equal to the thickness of the required grade of type plus that of a division wall to separate the mold from its neighbor. A plate 22' of the thickness of the required grade of type is placed against the surface of the part 21', and the second division wall 30' is added, the three being secured together by a screw 130'.

The mold support 24 is supported at its ends by members 124 formed on or attached to it. The form of these members is seen from Figs. 1, 2, 5, 15 and 16. The side members 129 of the frame have guide pieces 126 attached thereto, these guide pieces being formed with ribs 128 at the side and 127 at the top which engage in corresponding grooves in the sides of the members 124, and in projecting foot pieces 125 attached to these members, for instance by screws 225. A transverse member 86 connects the tops of the members 124, forming the parts 24, 124 and 86 with the members mounted thereon, into a single sliding carriage, hereinafter referred to as the mold carriage. The cover plate 27 of the molds is arranged to work over the tops of the molds and is attached to the underside of a plate 227 with end pieces 228, Figs. 18, 19 and 20, which will rest upon the ends of the mold support 24 and limit the forward movement by their front edges 229 (dotted in Fig. 18) contacting with faces 230 (Figs. 16 and 17) on the mold support. In actual working, however, the parts 37, 36 hereinafter referred to, and the mold cover 27 are pressed together against the front of the metal feeding spout 19 before the faces 129 and 130 come into contact. The mold cover is further supported by means of rollers 81 mounted on pins projecting from the end pieces 228 and working on guides 82 attached to the frame members 129 (Figs. 1, 2, 5, 18 and 19), and by an arm 83 attached to the plate 227 and carrying a roller 84 which works on a fixed guide piece 85 supported on a cross piece 285 which is supported upon the frame members 129 as seen in Figs. 1 and 5. The guide surfaces 82 and 85 are formed as cam surfaces, as seen in Fig. 1, and during the movement of the cover plate with the mold carriage away from the casting spout, these cam surfaces serve to raise the cover plate slightly so as to disengage the notches in the types from the ribs 23 by which they are formed. This action moreover saves wear in the relative movements of the cover plate over the molds. Angle pieces 226 attached to the ends of the blocks 228 form lateral guides working between the side members 124 of the mold carriage.

A bar 34 is arranged behind the cover plate 27 and is supported at its ends in slots or tracks formed at 234 in the members 228 (Figs. 18 and 19), so that the said bar will be capable of a little horizontal movement relatively to the plate 27. The matrix blocks 32 are mounted on this bar 34, and each block 32 preferably has a notch or frog 33 in its base to fit over a corresponding projecting portion on the bar 34, as seen in Figs. 1, 6 and 12. Of course if desired, matrices for casting the faces of two different types, or of two different sizes of types for the same letter, may be formed on the two opposite faces of each block 32, as these blocks are symmetrical and reversible. Moreover instead of providing special blocks for the machine, the matrix blocks $32^a$ commonly used in linotype machines may be employed as indicated in Fig. 8, supported in a bar $34^a$, in which case there will be wall plates between the blocks to make up the requisite width. It will be seen that the molds and matrices are thus interchangeable units, so that the mold or matrix of any one type can be varied without disturbing the rest of the molds and matrices. Thus any desired set of matrices may be arranged in the machine, for example the letters of an alphabet, and the machine when put in operation will repeatedly cast a corresponding set of types, for example will cast one complete alphabet at each operation.

In the machine forming the subject of the present application, the spout 19 no longer lies close against the fronts of the molds as was the case in the construction according to my Patent No. 789708, but it is continued to the molds by a slot or passage the lower face of which is formed by the top of the front wall 35 of the mold support 24. The upper face of the slot is formed partly by a bar 36 attached to the mold carriage and moving therewith, and partly by a bar 37 the ends of which are supported in and pass through slots 137 (Fig. 4) in the end pieces 124 of the carriage. The slots allow of a certain amount of relative movement between the bar 37 and the carriage, and stops 138 (Figs. 4 and 5) serve to limit the movement of the bar away from the spout, these stops being affixed to the guide members 126, or rather upon the ribs 127 thereof. The parts 35 and 36 may be provided with inwardly extending beaks as shown for forming notches in the bases of the types, or in some cases this provision may be dispensed with. The under surface of the bar 37 is formed with a series of grooves 99 preferably of semi-circular section, as seen in Fig. 15, which form passages allowing of easy access of the type metal to the molds, but also serve another purpose as explained hereinafter. Between the grooves 99 the face of the bar 37 lies almost in contact with the face of the part 35. The bar 37 is capable of a certain amount of longitudinal movement (across the frame 124), being pressed out at one side by a spring 38 (Figs. 2 and 5) bearing between a plate 239 on the side of the frame member 124, and a collar 237 fixed on the end of the bar. The bar 37 is moved sharply against the action of its spring 38 by a blow from a hammer 39 shown in plan in Fig. 5. The arm 240 of this hammer is pivoted at 140 on a pin on a lug 242 attached to the frame of the machine, and engages by its bent rear end by a pin 141, in a slot in a bar 142. This bar is guided to slide in members 41 projecting from the side of the frame 129 and a spring 40 is arranged tending to move the bar in a direction to throw the hammer head 39 against the end of the bar 37. This spring is shown in Figs. 5 and 23 as being on the bar 142 and as lying between one of the members 41 and a collar 340 on the bar. Of course it might be otherwise arranged to serve the same purpose. The bar 142 carries a roller 102 at its end which works against a snail cam 42 upon the main shaft 6. The support of this cam against the roller 102 is of course removed abruptly at a certain point in each revolution of the shaft 6, and when this occurs the spring 40 causes the hammer 39 to strike smartly against the end of the bar 37, moving it laterally to fracture the "break-piece" from the bases of the types 103 as hereinafter explained.

The various parts forming the molds move at one stage together and at another stage some parts move relatively to others. The mold carriage 24 has two arms 43 (Figs. 5, 16 and 17) projecting from it, and formed with hooked ends 44. These are engaged by the ends of levers 45 pivoted at 46 on the frame pieces 129, and connected by links 47 to levers 48 pivoted at 47 to the members 129. The levers 48 carry rollers 50 which bear against cams 51 on the shaft 6.

The cover plate 27 with the parts connected to it, is similarly moved by an arrangement of levers 53 and 55 (Figs. 1, 5, and 18) pivoted on transverse shafts 153 and 155 supported in the frame 129, the levers being connected by links 54, while rollers 56 on the levers 55 engage with cams 57 on the shaft 6, and the forked ends of levers 53 engage with pins 52 projecting from arms 152 fastened to the side pieces 228 of the cover plate 27 (Figs. 18 and 19); the method of securing the arms 152 illustrated in the drawings is by laying them in depressions in the tops of the pieces 228 and securing them by screws 153. Handles 80 are shown, attached to the end pieces 228 for enabling the cover plate with its attached parts to be lifted bodily out of the machine when required.

As has been mentioned already, the matrix supporting bar 34 is capable of a little movement relative to the cover plate 27. This movement is produced by means of a sliding bar 58 beveled at its lower end and carried upon the lower ends of two rods 59 (Figs. 1, 2, etc.,) which pass through the plate 227 and through guides 158 thereon (Figs. 1, 2 and 18), and are normally held up by springs 60 bearing upon the top of plate 227 and upon head pieces 159 on the rods. A standard 61 on the plate 227 carries a lever 62 pivoted at 63, and provided at one end with a roller 64 coacting with a stud 65 on the cam 92 hereinafter described, and at the other end with lateral projections adapted to rest upon the heads of the rods 59 (Figs. 1 and 5). The cam stud 65 therefore serves to depress the plate 58 against the action of the springs 59 and during this movement the beveled edge of the plate 58 presses back the matrix blocks 32 away from the cover plate 27, in the manner indicated in Fig. 7.

It is necessary that the parts should be tightly pressed together during the casting operation, and according to the present invention separate means are provided for clamping the cover plate tightly upon the molds and for pressing the movable parts against the spout. Steeply threaded screws 66 which work through the stout cross-bar or yoke 86 attached to the tops of members 124 of the mold carriage, serve to exert the necessary downward pressure upon adjustable blocks 67 mounted upon the cover plate. These blocks 67 have each a sloping under surface which rests against the upper surface of a wedge-shaped piece 167 mounted with the block 67 in a box 68 attached to the cover plate (Fig. 9). The lower wedge piece 167 can be moved backward or forward by a screw 69 passing through the wall of the box 68, and by this means the adjustable block 67 can be moved up or down. The screws 66, which are preferably square threaded, carry at their tops, above the bar 86, lever arms 70 which project normally toward the bar 72 but at an angle thereto, as seen for instance from Figs. 1 and 2, and in plan in Fig. 24. A hole is formed at the end of each of these arms in which is inserted one end of a link 71 which engages over the cross bar 72 mounted on columns 172 on the frame of the machine. This loose connection with the frame permits the ends of arms 70 to move along the bar 72. The screws 66 are rotated in one direction to raise the screws as the carriage is moved backward, by the links 71 holding the arms 70 against the bar 72, while the levers 70 bearing against the bar 72 turn the screws in the other direction to force them downward upon the blocks 67 as the mold carriage and cover plate move forward again. The necessary horizontal pressure to close the mold parts against the spout 19, is applied by cams 73 which press against rollers 74 mounted in jaws in lugs 76, and held in said jaws by springs 75 engaging over the axles of said rollers, as seen in Figs. 1, 2 and 22. Each lug 76, together with a plate 77 lying immediately behind it, is pivotally supported or hinged by a pin passing through lugs 79 on the back of plate 227. The distance apart of the lower ends of lugs 76 and plates 77 can be adjusted by means of screws 78, so that the distance of the pivots of the rollers 74 from the plates 77 which bear against the carriage, can be varied slightly at will. The hinging of the plates 77 and lugs 76 on the plate 227 enables these parts to swing freely and allow the matrix blocks and their support 34 the requisite movement relative to the cover plate 27. There is one other moving part upon the carriage, namely, the bar 88 which slides in grooves in the end pieces 124, as seen at 188 in Figs. 5, 16 and 17, and has two upward projections 89 having slots in which engage springs 90 normally tending to raise the bar 88. The part 86 of the carriage through which the screws 66 work, has pieces 187 attached to it on which are pivoted at 288 the arms of a forked lever 87 carrying a roller 91 which co-acts with the cam 92 on shaft 6, Figs. 1 and 5. The forwardly projecting ends 93 of the forked lever 87 bear upon the upward projections 89 of the bar 88, so that when the roller 91 is raised the bar 88 is depressed.

The operation of the whole apparatus is largely similar to that of the device described in the specification of my prior patent above referred to, but as it differs in a number of details it will be well to outline here the course of events throughout a complete cycle of the machine. It will be assumed that the molds, matrices and cover plate are all in position ready to receive the molten type metal as in Fig. 1, and that the first event of the operation is the release of the roller 7 from the outer surface of the snail cam 5. This causes a sudden depression of the pump plunger 4 under the action of the spring 13. The molten metal displaced passes through the spout 19, the transverse channels in the cock 20, through the semicircular slots in the bar 37 between the edges of the parts 35 and 36, and so into the mold cavities. The types 103 are thus cast and rapidly cooled by the water circulating through the various openings 26 in the cover plate, molds, and mold supports. The cams 51 next press back the rollers 50, so moving back the whole of the carriage and cover plate thereon, by means of the hooked parts 44. This movement serves to separate the metal 150 attached to the types 103 from that contained in the spout 19, which of course always remains at least soft if not absolutely molten. After a short space the rollers 81 and 84 ride up the cam surfaces 82 and 85, and so raise the cover plate off the surface of the molds, the screws 66 being already sufficiently turned by the links 71 to remove the vertical pressure and allow the cover plate to rise. During this movement of the carriage also the cam 42 suddenly releases the rod 142, and the hammer 39 is thrown by the spring 40 against the end of the rod 37. This rod is thus moved longitudinally and breaks off the piece of metal 150 called the "break-piece" lying directly under the rod and between the spout 19 and bases of the types. This break-piece is shown in Fig. 13; it consists of a thin strip of metal flat at the bottom, with a wedge shaped end at the front corresponding to the slot leading into the mold cavities, which slot is formed by the edges of the parts 35 and 36, being beveled as shown in the drawing. At the back, the break-piece 150 has a rough edge where it is separated from the metal in the spout, and there are a set of approximately semicircular ribs 101 along the thin central strip corresponding to the semicircular passages 99 in the bar 37, Fig. 15. It has been found by experiment that a break-piece formed in this way will be comparatively rigid and will come out usually in a single piece. The thin bottom part is always sufficiently solid to insure rigidity, while the ridges on the break-piece serve to receive the shock throughout the length of the piece independently of its rigidity. As a rule the piece 150 will break away so as to leave the bottoms of the types 103 quite cleanly cut, but if there is any roughness in the fracture it will be in the notch at the bottom of the types and will therefore not necessitate subsequent trimming. The cam 51 causes the movement of the carriage from the spout to continue and this movement results in the bar 37, which is caught by the stops 138 on the frame of the machine, remaining stationary so as to be separated a little from the remainder of the carriage.

When the movement of the carriage has been sufficient to bring the bar 88 clear of the edge of the bar 37, the cam 92 raises the roller 91 and the bar 88 is thus depressed and knocks off the break-piece 150 into any suitable receptacle provided to receive it. These break-pieces are of course waste metal and are returned to the pot to be melted up again. If desired a further plate may be provided arranged to descend between the casting operations to remove any adherent particles of metal from the spout 19. Up to this stage the types 103 are still completely inclosed in the molds, but the cams 57 now begin to operate upon the rollers 56 of levers 55, and through the links 54, levers 53 and pins 52 draw back the cover plate 27 and the parts associated therewith relatively to the remainder of the carriage. This movement can take place without undue friction, because the initial withdrawal of the whole carriage has sufficed to raise the screws 66 off the adjustable plates 67, so that there is no longer any pressure between the cover plate and the remainder of the carriage, while also the cam surfaces 82 and 85 have raised the cover plate out of contact with the molds, and so released the nicks in the type bodies 103 from the ribs 23 which formed them. The further movement of the cover plate and the matrix blocks 32 causes the withdrawal of the types 103 from the mold blocks 21 by the pins 28. At the end of the movement therefor, the types are simply supported in their horizontal position by their engagement with the pins 28 and with the matrices. When the types are so completely withdrawn from the mold cavities, the cam piece 65 raises the roller 64 so depressing the bar 58. This, as before indicated, moves back the matrix blocks 32 slightly relative to the cover plate and so releases the types 103 from the matrix, Fig. 7, immediately after which the edge of the bar 58 strikes the roots of the type letters and so knocks the types off the pins 28.

The types 103 may be allowed to fall into any suitable receptacle, and Figs. 6, 7 and 8 of the drawings show a tray 94 formed for receiving the types in channels formed at 96 on one face thereof. The tray 94 is carried on pivots at 95, which may be caused to rise and fall in any suitable way, the tray being tilted by contact with a bar 97 to cause said tray to turn and to discharge the types 103 into channels 98 of a suitable receiver. This device is not described in greater detail as of course any other suitable device may be employed for receiving the types as they are discharged from the molds. After the removal of the types that have been cast, the cams 73 begin to bear against the rollers 74 so first pressing back the matrix bar 34 with the blocks 32 against the cover plate 27, next pressing this cover plate over the carriage until the matrices are close against the rear of the mold blocks, and finally pressing the whole carriage up against the spout 19. The pressure of the cam serves to keep the carriage in this position during the casting operation while the motion of the whole carriage will also have caused the rotation of the screws 66 by their arms 70 working against the bar 72, so that these screws will press down the blocks 67, so forcing the cover plate tightly upon the edges 21 of the mold blocks. This pressure, however, is not applied until relative movement of the cover plate and mold is completed, so that it does not hinder this movement by increasing the friction. The return movement of the carriage will also press back the bar 37 against the spout 19 and this bar will return to its normal position so far as lateral displacement is concerned, under the action of the spring 38. Consequently the parts are now in complete readiness for a second casting operation, which will proceed in exactly the same manner as that described.

What I claim is:—

1. In a type casting machine, the combination of a plurality of molds, a cover plate common to said molds, matrix blocks, a casting spout and means for supplying molten metal thereto, with mechanism for removing said molds, cover plate and matrices simultaneously from said casting spout, and for subsequently moving said cover plate and matrices simultaneously from the said molds.

2. In a type casting machine, the combination of a plurality of molds, a cover plate common to said molds, matrix blocks, a casting spout and means for supplying molten metal thereto, with mechanism for removing said molds, cover plate and matrices simultaneously from said casting spout, means for lifting said cover plate out of contact with the molds and for subsequently moving said cover plate and matrices simultaneously from said molds.

3. In a type casting machine, the combination of a mold, a cover plate and matrix block therefor, a pin in said cover plate, and a screw engaging said cover plate and pressing on the pin.

4. In a type casting machine, the combination with molds, a cover plate, matrix blocks, a casting spout and means for supplying molten metal thereto, of means for moving said molds, cover plate and matrix blocks longitudinally of the type from the casting spout, means for lifting said cover plate and matrix blocks transversely of the type to remove them from the molds, means for withdrawing said matrix blocks and cover plate longitudinally of the type relatively to the molds, to remove the type from over the molds, and means for moving the matrix blocks longitudinally of the type relatively to the cover plate.

5. In a type casting machine, the combination of a mold comprising an upper and lower member and a matrix all relatively movable, a casting spout and means for supplying molten metal thereto, means for moving said molds while closed from the casting spout, means for subsequently withdrawing the type from said lower member by further motion of said upper member from the casting spout, and finally for disengaging the matrix therefrom.

6. In a type casting machine the combination of a carriage, mold blocks supported thereon and moving therewith, a cover plate and matrices completing the molds supported on but movable relatively to the carriage, a casting spout and means for supplying metal thereto, with means for withdrawing the carriage from the casting spout and means for further moving the cover plate and matrices relatively to the carriage and away from said spout.

7. In a typecasting machine the combination of a carriage, mold blocks supported thereon and moving therewith, a cover plate and matrices completing the molds supported on but movable relatively to the carriage, a casting spout and means for supplying metal thereto, with cams, and links and levers coöperating with said cams and connected to the carriage and to the cover plate and matrices respectively so as to withdraw the carriage from the casting spout and subsequently further withdraw the cover plate and matrices from the casting spout by motion relatively to the carriage.

8. In a type casting machine the combination of a frame, a casting spout and means for supplying metal thereto, a carriage movable in said frame to and from the casting spout, mold blocks supported on said carriage, a cover plate and matrix blocks movable on said carriage adjacent to the mold blocks, with means for moving the carriage molds, cover plate and matrix blocks from the casting spout, for lifting the cover plate and matrix blocks from the mold blocks and for moving the cover plate and matrix blocks horizontally from the mold blocks.

9. In a type casting machine the combination of a frame, a casting spout and means for supplying metal thereto, a carriage movable in said frame to and from the casting spout, mold blocks supported on said carriage, a cover plate and matrix blocks movable on said carriage adjacent to the mold blocks, a support for said matrix blocks, and cam surfaces on the frame, with means for moving the carriage molds, cover plate and matrix block support from the casting spout so that the cover plate and matrix block support engage with the cam surfaces of the frame and are thereby lifted from the mold blocks, and means for subsequently moving the cover plate and matrix block horizontally from the mold blocks.

10. In a type casting machine the combination of a casting spout and means for supplying metal thereto, mold blocks movable relatively to the casting spout, a cover plate and matrices completing the molds, and movable relatively to the casting spout and relatively to the mold blocks longitudinally thereof, with means for pressing the cover plate and matrices upon the mold blocks, and means for subsequently pressing the cover plate, matrices and mold blocks simultaneously against the casting spout.

11. In a type casting machine, the combination of a casting spout and means for supplying molten metal thereto, a frame, mold blocks slidable thereon, means for reciprocating said mold blocks, guides, a cover plate and matrix blocks slidable thereon, and means for reciprocating said cover plate and matrix blocks, said guides being formed to lift the cover plate and matrix blocks in the course of their reciprocation.

12. In a type casting machine the combination of a frame, a casting spout and means for supplying metal thereto, a carriage movable relatively to the casting spout, mold blocks supported thereon, a cover plate and matrices movable with and relatively to the mold blocks, screws mounted in said carriage and bearings on the cover plate, arms upon said screws with means for pressing the matrices against the mold blocks, and subsequently pressing the carriage with mold blocks, cover plate and matrices toward the casting spout so that the arms upon the screws engage against the frame, rotate the screws and depress the cover plate upon the mold blocks.

13. In a type casting machine, the combination of a casting spout and means for supplying molten metal thereto, a frame, mold blocks slidable thereon, means for reciprocating said mold blocks, guides, a cover plate and matrix blocks slidable thereon, and means for reciprocating said cover plate and matrix blocks to a greater extent than the mold blocks.

14. In a type casting machine the combination of a carriage, mold blocks supported thereon, a cover plate and matrices completing the molds, wedge shaped blocks adjustable in said cover plate, screws mounted on said carriage, and bearing on said wedge shaped blocks, and means for rotating said screws to press the cover plate upon the mold blocks.

15. In a type casting machine the combination of a carriage, mold blocks supported thereon, a cover plate and matrices completing the molds, screws mounted on said carriage, arms upon said screws, and means for reciprocating the carriage so as to bring said arms against the frame and thereby rotate the screws and apply pressure.

16. In a type casting machine the combination of a carriage, mold blocks supported thereon, a cover plate and matrices completing the molds, screws mounted on said carriage, arms upon said screws, and means for reciprocating the carriage, and connections between the arms and the frame whereby reciprocation of the carriage causes revolution of the screws to press down and release the cover plate alternately.

17. In a type casting machine, the combination of mold blocks, a cover plate movable vertically and horizontally relatively to said blocks, matrix blocks movable in one direction relatively to said cover plate and mold blocks, and means for pressing on said matrix blocks to force them and the cover plate into contact with one another and with the mold blocks.

18. In a type casting machine, the combination with mold blocks, a cover plate and matrix blocks movable in one direction relative to said cover plate and mold block, of means for withdrawing said cover plate longitudinally from said mold blocks, and independent means for pressing on said matrix blocks to force all the parts together.

19. In a type casting machine, mold blocks, a cover plate and matrices completing the molds, means for moving said cover plate and matrices relatively to the mold blocks to withdraw the types therefrom, a beveled plate slidably mounted on said cover plate adjacent the edge thereof, and means for depressing said plate between the matrices and cover plate, to separate them and release the type heads.

20. In a type casting machine, the combination of a casting spout, and means for supplying molten metal thereto, molds composed of separable parts, means for reciprocating said molds, while closed, to and from the spout, and means for opening and closing said molds so as to free the type while removed from the spout and means for ejecting said type longitudinally of the molds.

21. In a type casting machine, the combination of mold blocks, a cover plate, matrix blocks, means for moving said cover plate and matrix blocks simultaneously from said mold blocks so as to release the types therefrom, and a beveled bar adapted to slide between said cover plate and matrix blocks to disengage the matrices.

22. In a type casting machine the combination of a casting spout, means for supplying metal thereto, a plurality of type molds, members forming a "break-piece" uniting all the types in said molds and means for imparting an endwise shock to said "break-piece" to sever it from the types.

23. In a type casting machine the combination of a casting spout, means for supplying metal thereto, a plurality of type molds, members interposed between said spout and the molds and forming a passage to the latter, protuberances on one of said members projecting toward the other, and means for imparting an endwise shock to the solid metal between said members.

24. In a type casting machine the combination of a casting spout, means for supplying metal thereto, a plurality of type molds, members forming a "break piece" uniting all the types in said molds and engaging longitudinally with one of said members at intervals, and means for imparting an endwise shock to said break piece to sever it from the types.

25. In a type casting machine the combination of a casting spout, means for supplying metal thereto, a plurality of type molds, members forming a "break-piece" uniting all the types in said molds, a hammer and means for impelling said hammer endwise against said break piece to sever it from the types.

26. In a type casting machine the combination of a casting spout, means for supplying metal thereto, a plurality of type molds, members forming a "break piece" uniting all the types in said molds, and engaging longitudinally with one of said members at intervals, a hammer and means for impelling said hammer against the end of the engaging member so as to sever the "break piece" from the types.

27. In a type casting machine the combination of a casting spout, means for supplying metal thereto, a plurality of type molds, a member interposed between said spout and the molds and adapted to form the lateral walls of a series of ducts one for each mold, and means for moving said member longitudinally so as to sever the cast metal in all the ducts simultaneously.

28. In a type casting machine, the combination of a casting spout, mold blocks and a cover plate movable to and from said spout, matrix blocks adapted to engage said mold blocks and cover plate in one direction of motion, a cam shaft and cam thereon, and an adjustable abutment interposed between said cam and the matrix blocks.

29. In a type casting machine the combination of a casting spout and means for supplying metal thereto, a plurality of type molds, members one above the other interposed between said spout and molds and forming ducts to the latter, a carriage supporting said molds and lower member, means for severing the metal between said members from all the types simultaneously, and means for reciprocating said carriage so as to withdraw the lower member from beneath the other.

30. In a type casting machine the combination of a casting spout and means for supplying metal thereto, a plurality of type molds, members one above the other interposed between said spout and molds, and forming ducts to the latter, a bar adjacent to said upper member, a carriage supporting said molds, bar and lower member, means for severing the metal between said members from all the types simultaneously, means for reciprocating said carriage so as to withdraw the lower member from beneath the other and means for causing the bar to descend beside the upper member and detach the severed metal therefrom.

31. In a type casting machine the combination of a casting spout and means for supplying metal thereto, a plurality of molds, ducts between said molds and spout, means for withdrawing said molds from said spout, a bar adjacent to said ducts, and means for causing said bar to descend to disengage the cast metal from said ducts.

32. In a type casting machine the combination of a carriage, a plurality of separate molds supported thereon each mold comprising a block slotted on one face and a plate fitting in the slot to form the base of the mold, a cover plate adapted to close the molds at the top, a set of matrix blocks and means for supporting the same, a casting spout and means for supplying molten metal thereto and means for moving the cover plate and matrix blocks backward relatively to the mold carriage and for discharging the cast types from the cover plate.

33. In a type casting machine, the combination of a plurality of separate molds and a carriage supporting same, each mold comprising a side plate and a separate portion forming the base with means attaching it to the side plate, a cover plate extending over all the molds, a matrix bar with matrix blocks thereon forming the closing members for the molds at the rear, means for supplying molten metal to the molds at the end opposite to the matrix blocks, and means for moving the cover plate and matrix blocks rearwardly relative to the molds and for discharging the cast types from the cover plate.

34. In a type casting machine, the combination of a casting spout, mold blocks, a cover plate and matrix blocks movable longitudinally and laterally relatively to said mold, means for moving said cover plate longitudinally of the mold blocks into position over them, and means for subsequently pressing said cover plate laterally of the mold blocks into contact therewith.

35. In a type casting machine, the combination of a casting spout, mold blocks movable to and from said spout, a cover plate adapted to be pressed down on said mold blocks, means for moving said cover plate longitudinally over said mold blocks, means for pressing said cover plate upon the mold blocks when relative longitudinal motion has ceased, and means for pressing mold blocks and cover plate against the casting spout.

36. In a type casting machine, the combination of upper and lower mold parts, matrix blocks, lugs hinged upon said upper mold parts, and extending behind said matrices, a beveled bar adapted to be interposed between said upper mold part and the matrices, and means for pressing on said lugs to force the matrices and mold parts together.

In testimony whereof I have signed my name to this specification in the presence of two subscribing witnesses.

SHANKER ABAJI BHISEY.

Witnesses:
R. MELETA,
K. D. WACHER.

Copies of this patent may be obtained for five cents each, by addressing the "Commissioner of Patents, Washington, D. C."